United States Patent
Yu (10) Patent No.: US 11,493,455 B1
(45) Date of Patent: Nov. 8, 2022

(54) DETECTOR AND DETECTING SYSTEM FOR PROTECTING TRANSMISSION LINE THEREIN

(71) Applicant: Ping Yu, Yichun (CN)

(72) Inventor: Ping Yu, Yichun (CN)

( * ) Notice: Subject to any disclaimer, the term of this patent is extended or adjusted under 35 U.S.C. 154(b) by 0 days.

(21) Appl. No.: 17/541,206

(22) Filed: Dec. 2, 2021

(30) Foreign Application Priority Data

Nov. 26, 2021 (CN) .......................... 202122946372.1

(51) Int. Cl.
*G01N 21/954* (2006.01)
*H04N 5/225* (2006.01)

(52) U.S. Cl.
CPC ......... *G01N 21/954* (2013.01); *H04N 5/2252* (2013.01); *H04N 5/2256* (2013.01); *G01N 2021/9542* (2013.01); *H04N 2005/2255* (2013.01)

(58) Field of Classification Search
CPC ......... G01N 21/954; G01N 2021/9542; H04N 5/2252; H04N 5/2256; H04N 2005/2255
See application file for complete search history.

(56) References Cited

U.S. PATENT DOCUMENTS

| | | | |
|---|---|---|---|
| 2016/0089000 A1* | 3/2016 | Hara | A61B 1/00112 600/112 |
| 2017/0224204 A1* | 8/2017 | Sekiguchi | H01B 7/04 |
| 2018/0038093 A1* | 2/2018 | Olsson | H01B 1/02 |
| 2019/0305476 A1* | 10/2019 | Kralik | H01R 13/562 |

FOREIGN PATENT DOCUMENTS

| | | | |
|---|---|---|---|
| CN | 203873791 U | * | 10/2014 |
| CN | 211408972 U | * | 9/2020 |
| JP | 2001137251 A | * | 5/2001 ......... A61B 1/00098 |

* cited by examiner

*Primary Examiner* — Richard A Hansell, Jr.

(57) ABSTRACT

The present disclosure may relate to a detector and a detecting system. The detector may include a probe, a first connector connected to the probe, a second connector configured to connect to an external apparatus, an elastic member arranged between and connected to the first connector and the second connector, a transmission line and a flexible protector. An end of the transmission line may pass through the first connector and connect with the probe. The other end of the transmission line may connect with the second connector. An end of the flexible protector may be connected to the first connector. The other end of the flexible protector may be connected to the second connector. The length of the flexible protector may be greater than that of the elastic member in its natural state, and less than that of the transmission line between the first connector and the second connector.

19 Claims, 8 Drawing Sheets

DETECTOR AND DETECTING SYSTEM FOR PROTECTING TRANSMISSION LINE THEREIN

CROSS REFERENCE TO RELATED APPLICATION

The present application claims foreign priorities of Chinese Patent Application No. 202122946372.1, filed on Nov. 26, 2021 in the National Intellectual Property Administration of China, the entire contents of which are hereby incorporated by reference in their entireties.

TECHNICAL FIELD

The present disclosure relates to a technical field of a detector, in particular to a detector and a detecting system.

BACKGROUND

Detectors are often used to detect areas where operating personals are incapable or unwilling to enter and directly detect, such as natural cavities of man or animals, tunnels and urban underground pipelines. For example, pipeline detectors are widely used for pipeline inspection and maintenance. Especially in some narrow pipelines with harsh environment, operating personals cannot enter the site for a direct survey, and thus need to obtain video signals from inside of the pipelines through cameras and transmit the signals out.

SUMMARY OF THE DISCLOSURE

According to one aspect of the present disclosure, a detector may be provided. The detector may include a probe, a first connector connected to the probe, a second connector configured to connect to an external apparatus, an elastic member arranged between and connected to the first connector and the second connector, a transmission line and a flexible protector. An end of the transmission line may pass through the first connector and be connected to the probe. The other end of the transmission line may be connected to the second connector. An end of the flexible protector may be connected to the first connector. The other end of the flexible protector may be connected to the second connector. The length of the flexible protector may be greater than the length of the elastic member in its natural state, and less than the length of the transmission line between the first connector and the second connector.

According to another aspect of the present disclosure, a detector may be provided. The detector may include a probe, a first connector connected to the probe, a second connector configured to connect to an external apparatus, an elastic member arranged between and connected to the first connector and the second connector, a transmission line and a flexible protector. The elastic member may define an internal passage. An end of the transmission line may pass through the first connector and be connected to the probe. The other end of the transmission line may be connected to the second connector. An end of the flexible protector may be connected to the first connector. The other end of the flexible protector may be connected to the second connector. The transmission line may be arranged in the internal passage. In response to the elastic member being elastically deformed, the flexible protector may be configured to keep connecting with the first connector and the second connector, and protect the connection of the transmission line with the first connector and the second connector.

According to yet another aspect of the present disclosure, a detecting system may be provided. The detecting system may include the detector mentioned above, the display and the cable. The detector may to configured to acquire detection data. The display may be configured to display the detection data detected by the detector. The cable may be connected between the second connector and the display, and may be connected to the transmission line of the detector through the second connector. The cable may be configured to connect the detector and the display, and may send the detection data to the display.

The advantage of the present disclosure is: distinguishing from the prior art, the detector in the present disclosure may include an elastic member and a flexible protector arranged between and connected to the first connector and the second connector. An end of the flexible protector may be connected to the first connector. The other end of the flexible protector may be connected to the second connector. The length of the flexible protector may be set to be greater than the length of the elastic member in its natural state, and less than the length of the transmission line between the first connector and the second connector. With this arrangement, the flexible protection member may limit the length of the elastic member after deformation to be less than the length of the flexible protector when the elastic member is bent or stretched. Since the length of the flexible protector is less than the length of the transmission line between the first connector and the second connector, the flexible protector may limit the length of the elastic member after deformation to be less than the length of the transmission line between the first connector and the second connector, thus ensuring that the transmission line cannot be stretched and serving to protect the transmission line.

BRIEF DESCRIPTION OF THE DRAWINGS

In order to more clearly illustrate technical solutions in the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts.

DETAILED DESCRIPTION

Technical solutions in embodiments of the present disclosure will be described clearly and thoroughly in connection with accompanying drawing of the embodiments of the present disclosure. Obviously, the described embodiments are only a part of the embodiments, but not all of them. All other embodiments obtained by a person of ordinary skills in the art based on embodiments of the present disclosure without creative efforts should all be within the protection scope of the present disclosure.

In the description of the present disclosure, it should be understood that the terms "middle", "longitudinal", "transverse", "length", "width", "thickness", "upper", "lower", "front", "rear", "left", "right", "vertical", "horizontal", "top", "bottom", "inner", "outer", "clockwise", "counterclockwise" and others indicate directions or positions that are based on the orientation or position relationship shown in the drawings, and are only for the convenience of describing the application and simplification of the description, but not indicate or imply that the apparatus or unit referred to must have a specific orientation, be constructed and operated in a specific orientation, therefore cannot be construed as a restriction on this application.

In addition, the terms "first" and "second" are only for the purpose of description, and cannot be construed as indicating or implying relative importance or implicitly indicating the number of technical features referred to. Thus, the features preceded by "first" and "second" may explicitly or implicitly include one or more of these features. In the description of the present disclosure, "a plurality of" means two or more than two, unless otherwise specifically defined.

In the present disclosure, unless otherwise definitely specified and limited, the terms "installed", "joined", "connected", "fixed" and other terms should be understood in a broad sense, for example, they can be fixed connections or detachable connections, or integrally connected. In some embodiments, they can be mechanical connections or electrical connections. In some embodiments, they can be direct connections or indirect connections through intermediate mediums, and they can be an internal communication between two components. For those of ordinary skills in the art, the specific meanings of the above-mentioned terms in the present disclosure can be understood according to specific circumstances.

In the present disclosure, unless expressly stipulated and defined otherwise, "the first feature is above or below the second feature" may include situations that the first feature directly contacts with the second feature, or the first feature and the second feature do not contact directly but through another feature therebetween. Further, the first feature is on or above the second feature may include situations that the first feature is directly or obliquely above the second feature, or merely indicate that the first feature has a elevational high greater than the second feature. The first feature is under or below the second feature may include situations that the first feature is directly or obliquely below the second feature, or merely indicate that the first feature has a elevational high less than the second feature.

A detector may be provided in the present disclosure. The detector is often used to detect areas where operating personals are incapable or unwilling to enter and directly detect, such as natural cavities of man or animals, tunnels and urban underground pipelines, which is not limited in the present disclosure. Taking a pipeline detector as an example, the present disclosure may be further detailed below in conjunction with the accompanying drawings.

Figure 1:
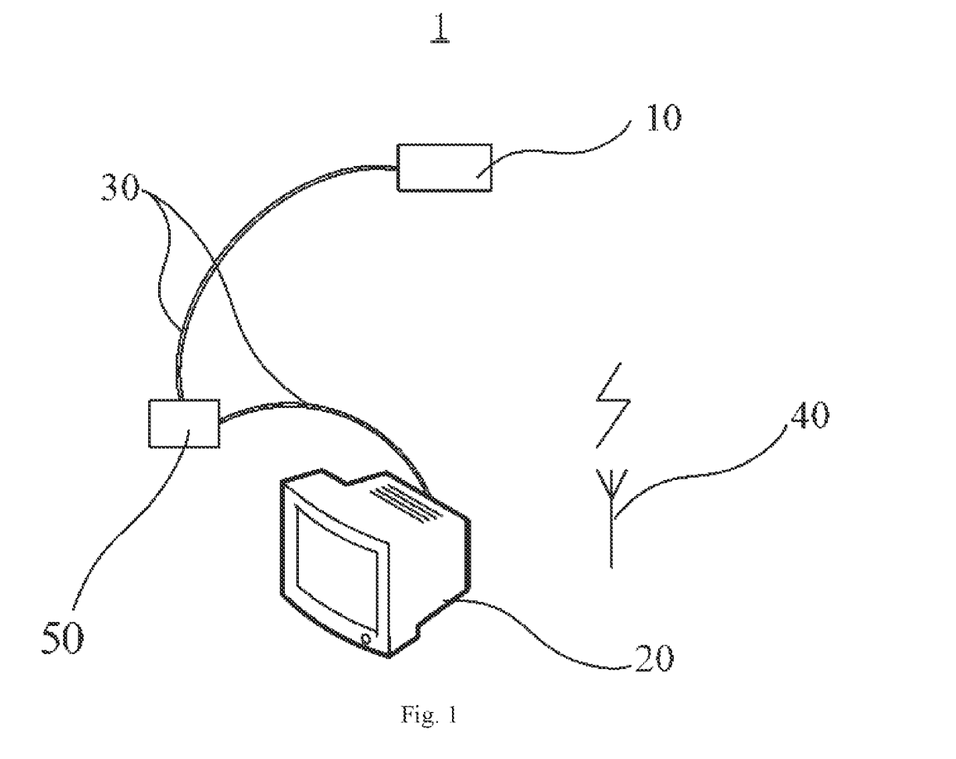
FIG. 1 is a schematic diagram of the detecting system according to one embodiment of the present disclosure.

Referring to FIG. 1. FIG. 1 is a schematic diagram of the detecting system 1 according to one embodiment of the present disclosure. As shown in FIG. 1, the detecting system 1 may include a detector 10 and a display 20 connected by a cable 30. The detector 10 may be configured to detect conditions inside a pipeline by, for example, a camera, and to acquire detection data. In some embodiments, the detector 10 may also be configured with locating function. For example, when a malfunction location or a blockage location inside the pipeline is detected by the detector 10, the detector 10 may locate the malfunction location or the blockage location. The display 20 may be configured to display the data acquired by the detector 10. In some embodiments, the display 20 may be configured to display images shot by the detector 10. Those skilled in the art should understand that, the display 20 may be dedicated to the detecting system 1. In some embodiments, the display 20 may be other kind of apparatus with display function. For example, the display 20 may be a mobile terminal such as a mobile phone, a tablet etc. or a computer device such as a notebook computer, a desktop computer and the like. The cable 30 may be configured to connect or link the detector 10 and the display 20 together, and transmit the detection data to the display 20. In some embodiments, the cable 30 may also be configured to provide electrical power to the detector 10.

As shown in FIG. 1, the detecting system 1 may further include a signal receiver 40. The signal receiver 40 may be configured to receive the signal emitted by the detector 10, to determine the location of the detector 10. The signal receiver 40 may receive signals such as Wi-Fi, AM, FM, etc., which is not limited in the present disclosure.

As shown in FIG. 1, the detecting system 1 may further include a wire-winding frame 50. The above-mentioned cable 30 may be wound on the wire-winding frame 50. The wire-winding frame 50 may be configured to rewind/take in or unwind/release the cable 30 according to the operation requirements of the detector 10, so as to control the length of the released cable 30.

Figure 2:
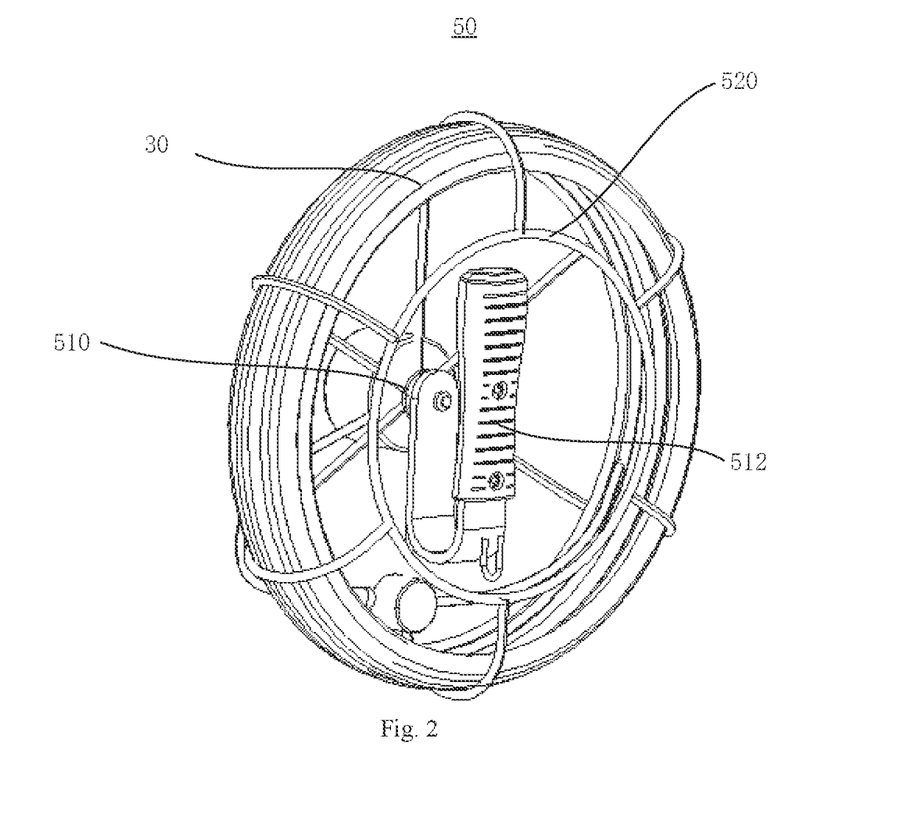
FIG. 2 is a perspective view of a wire-winding frame according to one embodiment of the present disclosure.
Figure 3:
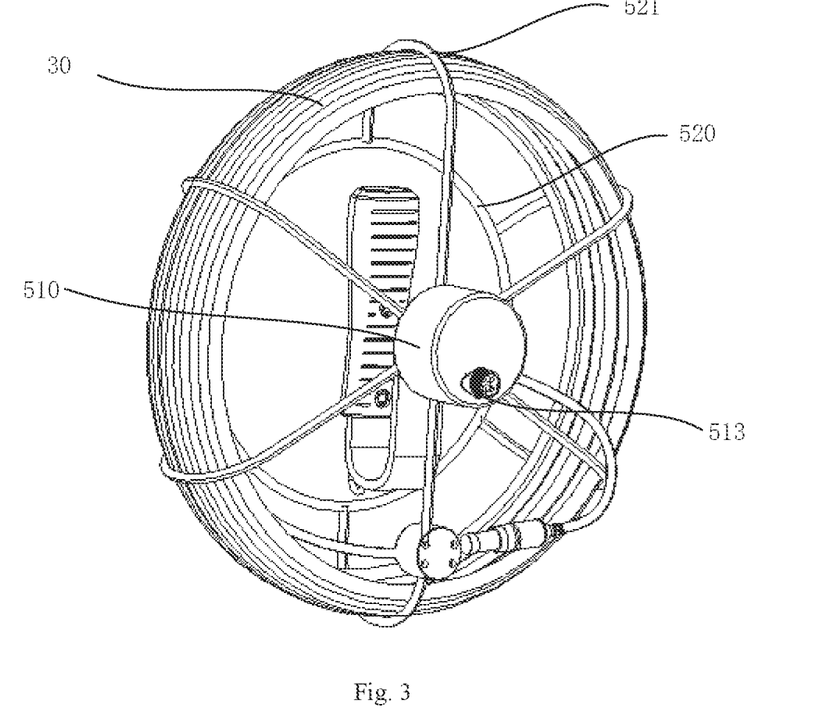
FIG. 3 is another perspective view of the wire-winding frame illustrated in FIG. 2.

Referring to FIG. 2 and FIG. 3. FIG. 2 and FIG. 3 illustrate the wire-winding frame 50 on which the cable 30 is wound respectively.

In some embodiments, the cable 30 may be a rigid cable 30 with a certain rigidity. In some embodiments, the cable 30 may be a semi-rigid cable 30. The rigid cable 30 may withstand a certain bending moment while not deform. Since the rigid cable 30 is not easy to bend and deform, by delivering the rigid cable 30 forwardly, the detector 10 connected to the cable 30 may be advanced in the pipeline. The distance that the detector 10 enters into the pipeline may be determined according to the length of the released cable 30. However, since the pipeline may be irregular or non-linear, the length of the rigid cable 30 may only be employed to determine the fault location or the blockage location inside a linear pipeline, but may not be employed to determine the fault location or the blockage location inside a non-linear pipeline. The signal receiver 40 mentioned above may be activated to determine the fault location or blockage location inside a non-linear pipeline.

In some embodiments, the cable 30 may be a metal stranded wire coated by a protective sheath. In some embodiments, the cable 30 may be an optical fiber coated with rigid protective sheath. In some embodiments, the cable 30 may include a metal stranded wire and an optical fiber both coated by a protective sheath. In some embodiments, the conductor and/or the protective sheath of the cable 30 may contribute to the rigidity of the rigid cable 30, which is not limited in the present disclosure.

Again referring to FIG. 2 and FIG. 3, the wire-winding frame 50 may include a main support frame 510 and a rotating bracket 520. The rotating bracket 520 may be rotatably mounted on the main support frame 510. The cable 30 may be wound on the rotating bracket 520, thus the cable 30 may be rewound or released by the rotation of the rotating bracket 520.

In some embodiments, a rotation axis of the rotating bracket 520 may be rotatably arranged on the main support frame 510. The rotating bracket 520 may further include a cable bearing frame 521 connected to the rotation axis. The cable 30 may be wound on the inner side of the cable bearing frame 521. In this way, the cable 30 may be restricted by the cable bearing frame 521 and thereby prevented from being elastically expanded and detached from the cable bearing frame 521. The cable 30 may be rewound or released by the rotation of the rotating bracket 520.

In some embodiments, the main support frame 510 of the wire-winding frame 50 may further include a grip handle 512 and a socket 513. The grip handle 512 may be fixedly connected to the main support frame 510 of the wire-winding frame 50 on one side of the rotating bracket 520. A user may hold the grip handle 512 and carry the wire-winding frame 50. The socket 513 may be arranged on the main support frame 510 on the other side opposing the grip handle 512. An end of the cable 30 may be electrically connected to the socket 513. The display 20 may be connected to the cable 30 through the socket 513. The socket 513 may help to establish a more stable connection between the cable 30 and the display 20. The other end of the cable 30 may move away from the wire-winding frame 50 as the cable 30 is released, or may move towards the wire-winding frame 50 as the cable 30 is rewound.

Figure 4:
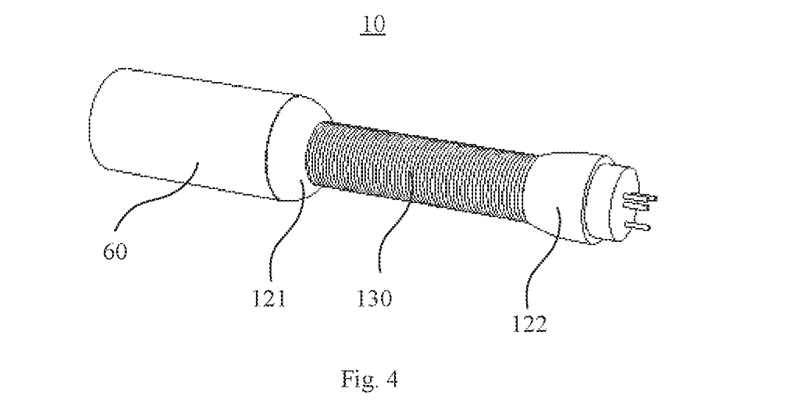
FIG. 4 is a schematic diagram of a detector according to one embodiment of the present disclosure.
Figure 5:
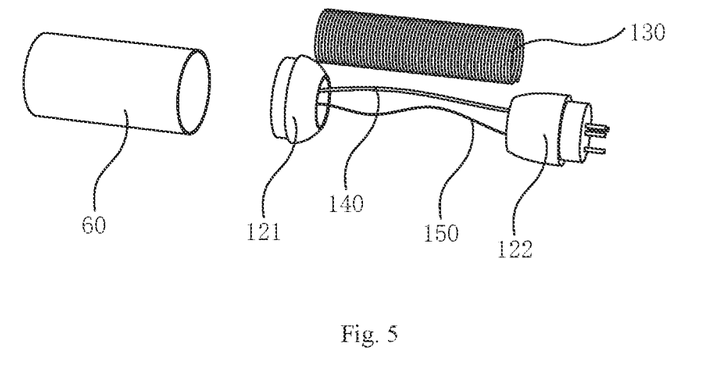
FIG. 5 is an exploded view of the detector illustrated in FIG. 4.

Referring to FIG. 4 and FIG. 5. FIG. 4 is a schematic diagram of an assembled detector 10 according to one embodiment of the present disclosure. FIG. 5 is an exploded view of the detector 10 illustrated in FIG. 4.

As shown in FIG. 4 and FIG. 5, in the present embodiment, the detector 10 may include a probe 60, a first connector 121, an elastic member 130 and a second connector 122 connected successively. Specifically, the first connector 121 may be removably connected to the probe 60 through a threaded connection, a snap/engagement connection and so on. The elastic member 130 may be fixedly connected between the first connector 121 and the second connector 122. The second connector 122 may be configured to connect to an external apparatus. In some embodiments, the second connector 122 may be configured to connect to the cable 30 as mentioned above.

In the present embodiment, the probe 60 may be configured to detect the situation inside the pipeline through photo or video shooting, to acquire the detection data. The elastic member 130 may be bent and deformed, thereby enabling the probe 60 to change its detection angle. In addition to the connection function, the first connector 121 and the second connector 122 may also be configured to fix the two ends of the elastic member 130.

Referring to FIG. 5, the detector 10 may further include a transmission line 140 and a flexible protector 150.

Specifically, an end of the transmission line 140 may pass through the first connector 121 and connect with the probe 60. The other end of the transmission line 140 may connect with the second connector 122. As mentioned above, the second connector 122 may be connected to the cable 30. Therefore, the transmission line 140 may send the detection data from the probe 60 to the display 20 through the cable 30.

Specifically, an end of the flexible protector may be connected to the first connector 121, the other end of the flexible protector 150 may be connected to the second connector 122. The flexible protector 150 may be configured to protect the transmission line 140, which will be detailed below.

Figure 6:
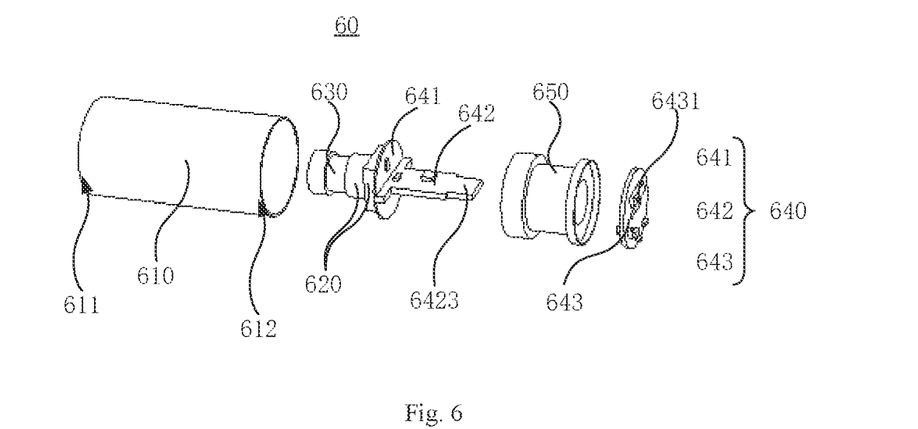
FIG. 6 is an exploded view of a probe according to one embodiment of the present disclosure.

Referring to FIG. 6. FIG. 6 is an exploded view of a probe 60 according to one embodiment of the present disclosure. As shown in FIG. 6, the probe 60 may include a housing 610, a seat 620, a camera 630, a circuit module 640 and a signal transmitter 650. The housing 610 may include a first end 611 and a second end 612 opposite to each other. The second end 612 of the housing 610 may be connected to the above-mentioned first connector 121. In some embodiments, the second end 612 of the housing 610 may be provided with a thread or an engaging member, for connecting with the corresponding thread or engaging member of the first connector 121. The seat 620 may be arranged inside the housing 610. The camera 630 may be arranged in the housing 610, and may be connected to one side of the seat 620. The camera 630 may be oriented towards the first end 611 of the housing 610, to acquire the detection data through camera shooting. The circuit module 640 may be at least partially arranged in the housing 610 and connected to another side of the seat 620 away from the camera 630 for controlling the camera 630 and/or the signal transmitter 650 and the like.

Figure 7:
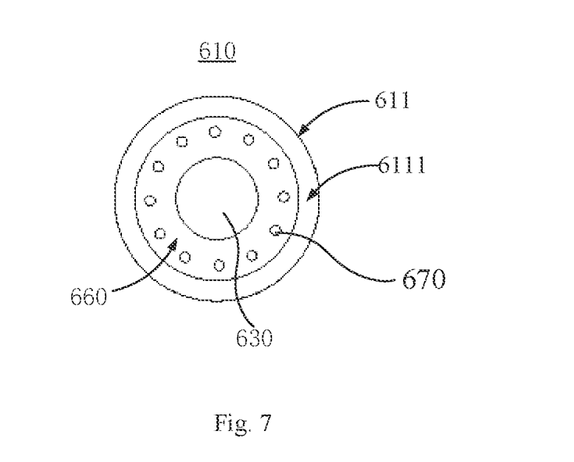
FIG. 7 is a side view of a housing according to one embodiment of the present disclosure.

Referring to FIG. 7. FIG. 7 is a side view of the housing 610 when viewed from the first end 611 according to one embodiment of the present disclosure. As shown in FIG. 7, the housing 610 may preferably be a tubular or cylinder that defines a cavity. The cavity may be configured to at least partially accommodate the above-mentioned seat 620, camera 630, circuit module 640, signal transmitter 650 and other parts. The housing 610 may be made of metals or metal alloys, to provide sealing and resistance against external impacts, thereby protecting the fragile parts accommodated in the housing 610. In some embodiments, the housing 610 may also be made of rigid plastic, etc., which is not limited in the present disclosure.

In some embodiments, the first end 611 of the housing 610 may be provided with a mounting flange 6111 that protrudes radially inward, for mounting structures such as a transparent cover 660 and a light source 670. Specifically, as shown in FIG. 7, the transparent cover 660 may be arranged at the first end 611 of the housing 610 for sealing the probe 60. In some embodiments, the transparent cover 660 may rest against or be adhered to the mounting flange 6111 of the housing 610 within the housing 610. The transparent cover 660 may be a circular transparent cover 660, which is made, for example, of a material such as transparent glass, transparent plastic, etc. The lens side of the camera 630 may be oriented toward the transparent cover 660 to receive light incident via the transparent cover 660. In some embodiments, the lens of the camera 630 may rest against the transparent cover 660 to aid in the positioning and securing of the camera 630 and the transparent cover 660.

As shown in FIG. 7, the probe 60 may further include a light source 670. A plurality of light sources 670 may be provided around the camera 630 at the inner side of the transparent cover 660, to illuminate the environment in front of the probe 60, thereby providing light for the camera 630. The light source 670 may preferably be an LED light bead. In some embodiments, the light source 670 may preferably be a diffuse light source 670.

Figure 8:
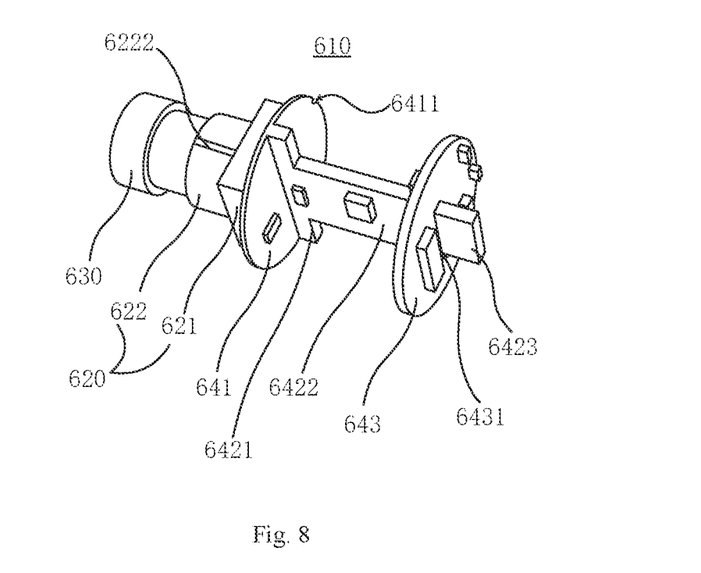
FIG. 8 is a schematic diagram of a camera, a seat and a circuit module according to one embodiment of the present disclosure.

Referring to FIG. 8 and FIG. 6. FIG. 8 is a schematic diagram of the camera 630, the seat 620 and the circuit module 640 according to one embodiment of the present disclosure.

As shown in FIG. 8, the seat 620 may include a rectangular body 621 and a column mount 622 extending from the rectangular body 621. The rectangular body 621 may have a rectangular cross-section. In some embodiment, the rectangular body 621 may have a square shape. The rectangular body 621 may also have a certain thickness along a direction perpendicular to the rectangular cross-section. The column mount 622 may be substantially cylindrical. An end of the column mount 622 may be connected to the rectangular body 621. The surface of the column mount 622 may be provided with at least a longitudinal projection 6222, to increase the surface heat dissipation area of the column mount 622.

In some embodiments, the rectangular body 621 and the column mount 622 may be a structure formed in one piece. In some embodiments, the column mount 622 may also be secured to the rectangular body 621 for example by bonding.

The seat 620 may be preferably made of metal material to facilitate heat dissipation. Of course, those skilled in the art should appreciate that the seat 620 may also be made of other materials such as plastics, ceramics, composites, etc., which is not limited in the present disclosure.

The rectangular body 621 of the seat 620 may define a through hole that penetrates it, such that wires may pass through the through hole. The column mount 622 may define a threaded through-hole that penetrates the column mount 622 and communicates with the through hole in the rectangular body 621, such that the camera 630 may be mounted in the threaded through-hole and wires may pass through the threaded through-hole.

As shown in FIG. 8, the camera 630 may be connected to the threaded through-hole of the seat 620. Specifically, the camera 630 may be provided with a thread on one side of the camera 630 that is opposite from the lens, and the camera 630 may be threaded into the threaded through-hole of the seat 620 through this thread. The camera 630 may also be fixedly connected to the seat 620 in other ways, which is not limited in the present disclosure. The lens of the camera 630 may face the first end 611 of the housing 610.

As shown in FIGS. 6 and 8, the circuit module 640 may include a first circuit module 641, a second circuit module 642 and a third circuit module 643. Specifically, the first circuit module 641 may be secured to one side of the seat 620 away from the camera 630. An end of the second circuit module 642 may be connected to the first circuit module 641, and may be arranged perpendicular to the first circuit module 641. The third circuit module 643 may be connected to another end of the second circuit module 642, and may be arranged in parallel with the first circuit module 641.

As shown in FIG. 8, the first circuit module 641 may have a shape of a circular disc. The first circuit module 641 may be fixedly connected to the seat 620 on one side of the disc. In some embodiments, the first circuit module 641 may be bonded to the rectangular body 621 of the seat 620 on one side of the disc. Electronic components may be arranged on the side of the first circuit module 641 away from the seat 620. A wire may be led out from the side of the first circuit module 641 closer to the seat 620. The wire may pass through the through hole of the seat 620 and be electrically connected to the camera 630.

In some embodiments, at least a notch 6411 may be provided on the circumference of the disc of the first circuit module 641 for positioning of the signal transmitter 650. Specifically, a corresponding projection on the signal transmitter 650 may be inserted in a notch 6411 of the first circuit module 641, thereby enabling alignment of the signal transmitter 650 with the circuit module 640. The notches 6411 of the first circuit module 641 may be arranged equidistantly on the circumference of the disc, which is not limited in the present disclosure.

As shown in FIG. 8, in some embodiments, the second circuit module 642 may be a circuit board with a substantially T-shaped configuration. Specifically, the T-shape may include a base portion 6421 and a protruding portion 6422. The base portion 6421 may form the lateral portion of the T-shaped configuration, while the protruding portion 6422 may form the vertical portion of the T-shaped configuration. The base portion 6421 may be fixedly connected to the first circuit module 641, for example, by bonding, ultrasonic welding, etc. In some embodiments, the base portion 6421 may be fixedly connected to the first circuit module 641 along a diametrical direction of the disc of the first circuit module 641. In some embodiments, the protruding portion 6422 may be continuously tapered along a direction away from the base portion 6421. In some embodiments, the protruding portion 6422 may extend at an end away from the base portion 6421 to form an insertion portion 6423. The width of the insertion portion 6423 may be less than the width of the protruding portion 6422. For example, as shown in FIG. 6, an insertion portion 6423 may be formed at an end of the protruding portion 6422 away from the base portion 6421, therefore at least a step may be formed. In some embodiments, the protruding portion 6422 may be continuously tapered along a direction away from the base portion 6421, such that the protruding portion 6422 may have a substantially trapezoidal configuration.

As shown in FIGS. 6 and 8, the third circuit module 643 may have a shape of a circular disc. In some embodiments, the disc diameter of the third circuit module 643 may be approximately equal to the disc diameter of the first circuit module 641. Electronic components may be arranged on the side of the disc of the third circuit module 643 away from the first circuit module 641. In some embodiments, a groove 6431 may be defined in the third circuit module 643. The groove 6431 may preferably be a slit opened along a diametrical direction of the disc of the third circuit module

643. The insertion portion 6423 of the second circuit module 642 may be plugged in the groove 6431 and later be secured to the third circuit module 643 by means of bonding or ultrasonic welding for example.

Figure 9:
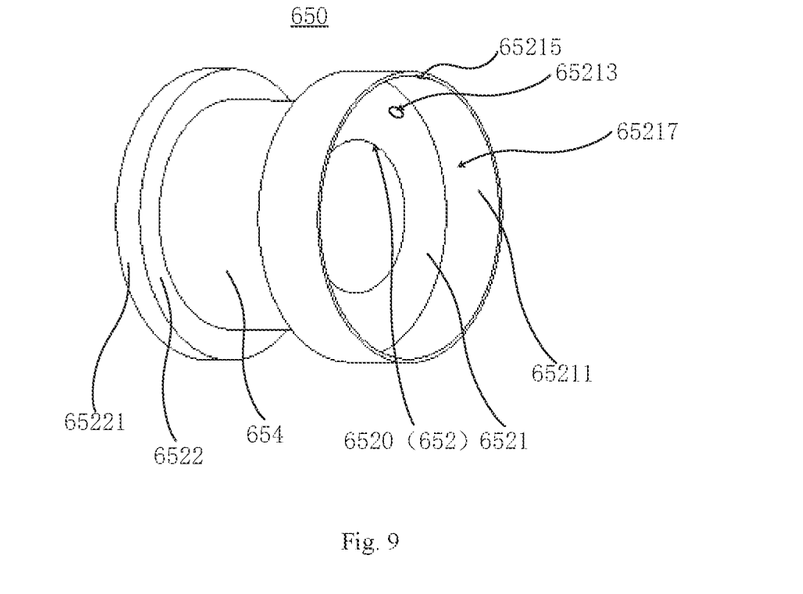
FIG. 9 is a schematic diagram of a signal transmitter according to one embodiment of the present disclosure.
Figure 10:
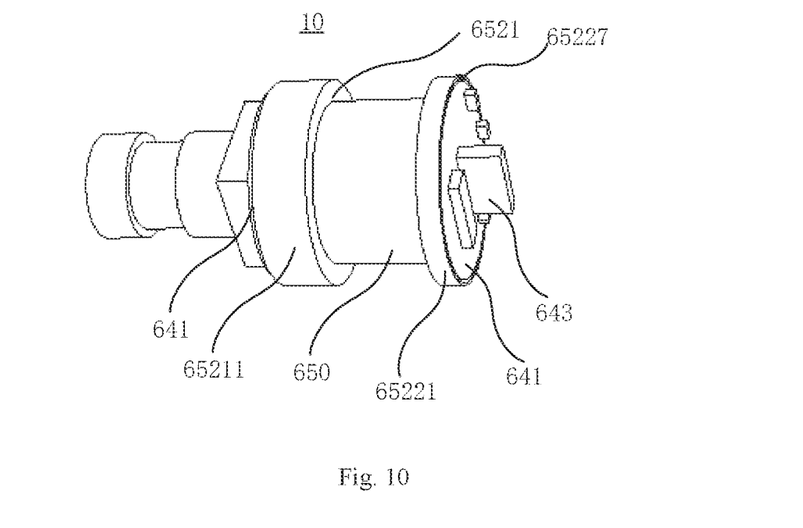
FIG. 10 is a schematic diagram of the signal transmitter assembled together with the circuit module according to one embodiment of the present disclosure.

Referring to FIG. 9 and FIG. 10. FIG. 9 is a schematic diagram of a signal transmitter 650 according to one embodiment of the present disclosure. FIG. 10 is a schematic diagram of the signal transmitter 650 assembled together with the circuit module 640 according to one embodiment of the present disclosure.

Specifically, the signal transmitter 650 may be configured to be arranged within the housing 610, to detect the location of the probe 60. The signal transmitter 650 may be electrically connected to the circuit module 640, and subsequently to the cable 30.

Specifically, the signal transmitter 650 can transmit a wireless signal such as Wi-Fi, AM, FM, etc. The signal receiver 40 of the detecting system 1 may be able to receive the wireless signal and locate the signal transmitter 650 based on the signal, and may determine the location of the probe 60 accordingly. In some embodiments, the signal transmitter 650 may be 512 Hz transmitter.

In some embodiments, when the user observes on the display 20 that the probe 60 may be at a malfunction location or a blockage location inside the pipeline, he/she can issue a locating command. This command may be transmitted to the circuit module 640 via the cable 30. The circuit module 640 may control the signal transmitter 650 to generate a locating signal. The signal receiver 40 may receive this locating signal. The location of the probe 60 may be acquired by the detecting system 1 based on the locating signal.

As shown in FIG. 9, the signal transmitter 650 may include a bracket 652 and a coil 654.

Specifically, the bracket 652 may include a columnar main body 6520. The main body 6520 may be hollow and sleeved on the circuit module 640, particularly surround the second circuit module 642.

Specifically, the coil 654 may be wound on the main body 6520 and two ends of the coil 654 may be connected to the circuit module 640. In some embodiments, the coil 654 may be an enameled wire, especially a copper wire coated with an insulation layer. Two ends of the copper wire may be led out from one side of the columnar main body 6520 to electrically connect with the circuit module 640.

As shown in the embodiment of FIG. 9, the bracket 652 may further include a first flange 6521 and a second flange 6522.

Specifically, the first flange 6521 may be connected to the end of the main body 6520 closer to the camera 630, and may project outward along a radial direction of the main body 6520. A first side wall 65211 may be arranged at the outer periphery of the first flange 6521. The first side wall 65211 may extend parallel to the axial direction of the main body 6520, to define a first accommodation cavity 65217. At least one portion of the circuit module 640 may be accommodated in the first accommodation cavity 65217. In particular, the first circuit module 641 may be accommodated in the first accommodation cavity 65217.

Specifically, the second flange 6522 may be connected to the other end of the main body 6520 away from the camera 630, and project outward along a radial direction of the main body 6520. A second side wall 65221 may be arranged at the outer periphery of the second flange 6522. The second side wall 65221 may extend parallel to the axial direction of the main body 6520, to define a second accommodation cavity 65227 (as shown in FIG. 10). At least one portion of the circuit module 640 may be accommodated in the second accommodation cavity 65227. In particular, the third circuit module 643 may be accommodated in the second accommodation cavity 65227.

In some embodiments, the first flange 6521 and the second flange 6522 may be arranged within the housing 610 by means of an interference fit. In particular, the first side wall 65211 of the first flange 6521 and the second side wall 65221 of the second flange 6522 may be stuck inside the housing 610 by means of an interference fit.

With the arrangement as described above, the bracket 652 of the signal transmitter 650 may accommodate the circuit module 640 as shown in FIG. 10. Further with the interference fit between the bracket 652 and the housing 610, the signal transmitter 650 may help to position and retain the circuit module 640 as well as the camera 630 within the housing 610.

In some embodiments, at least an opening 65213 may be provided in the first flange 6521 of the signal transmitter 650. Leads at both ends of the coil 654 may be connected to the circuit module 640 through the at least an opening 65213. In some embodiments, the first flange 6521 may also be provided with at least a projection 65215 that corresponds to the notch 6411 on the first circuit module 641 and may be inserted in the notch 6411 to help the alignment between the signal transmitter 650 and the circuit module 640.

Figure 11:
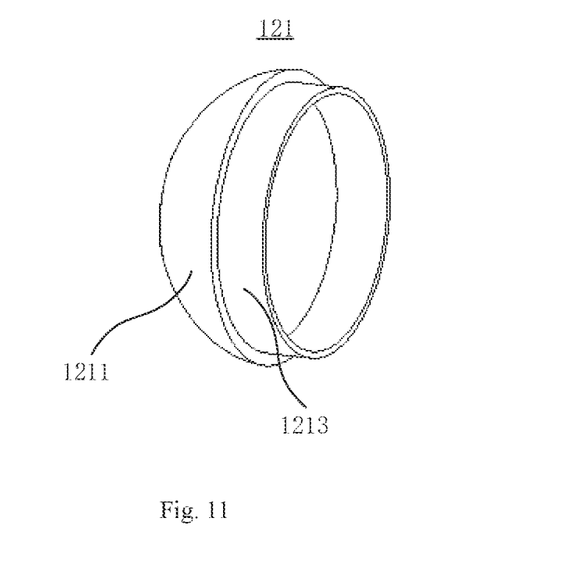
FIG. 11 is a schematic diagram of a first connector according to one embodiment of the present disclosure.

Referring to FIG. 11. FIG. 11 is a schematic diagram of a first connector 121 according to one embodiment of the present disclosure.

As shown in FIG. 11, the first connector 121 may include a first outer shell 1211 that defines a substantially hemispherical platform structure. The hemispherical platform structure may generally have a shape of a hemisphere, the top portion of the hemisphere may be truncated to form a top platform. The top platform of the hemispherical platform structure may be parallel with the bottom of the hemisphere. The cross-section of the first outer shell 1211 may taper in a direction away from the probe 60. A first connection portion 1213 may extend from one side of the first outer shell 1211 toward the probe 60 for connection with the second end 612 of the housing 610 of the probe 60. In some embodiments, the first connection portion 1213 may include a thread, for a threaded connection to the second end 612 of the housing 610. In some embodiments, this first connection 1213 may also be a snap-fit member for a snap-fit connection to the second end 612 of the housing 610. In some embodiments, the elastic member 130 may be connected to the end of the first outer shell 1211 away from the probe 60. The first connector 121 may also define an intermediate passage for a wire to pass through.

Figure 12:
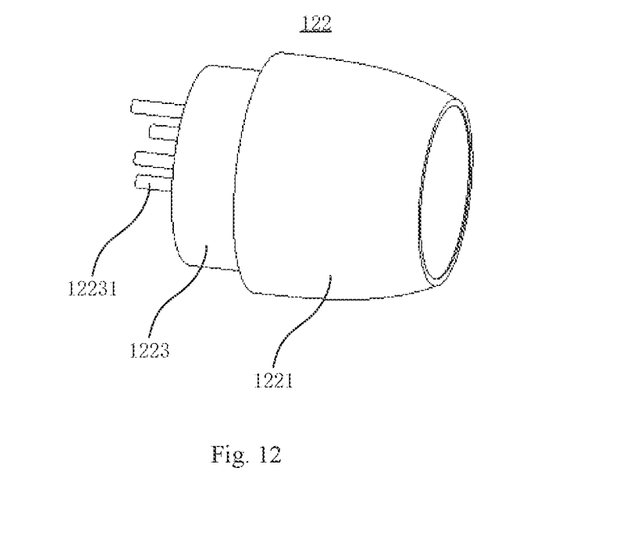
FIG. 12 is a schematic diagram of a second connector according to one embodiment of the present disclosure.

Referring to FIG. 12. FIG. 12 is a schematic diagram of a second connector 122 according to one embodiment of the present disclosure.

As shown in FIG. 12, the second connector 122 may include a second outer shell 1221 that defines a substantially cylindrical structure. In some embodiments, the second outer shell 1221 may define a substantially conical or truncated conical structure. The cross section of the second outer shell 1221 may taper in a direction closer to the probe 60. In some embodiments, the second outer shell 1221 may define a substantially spindle-shaped structure. In some embodiments, the spindle-shaped structure may be asymmetrical. For example, the end of the spindle-shaped structure away from the probe 60 may be more pointed and thin.

In some embodiments, as shown in FIG. 12, a plug 1223 may extend from a side of the second outer shell 1221 away from the probe 60 for connection with an external apparatus.

The external apparatus may be the above-mentioned cable 30. As shown in FIG. 12, the plug 1223 may include at least a plug pin 12231. Those skilled in the art should understand that, the plug 1223 may have other shapes, which is not limited in the present disclosure.

In some embodiments, as shown in FIGS. 5 and 12, the elastic member 130 may be connected to the end of the second outer shell 1221 closer to the probe 60.

Figure 13:
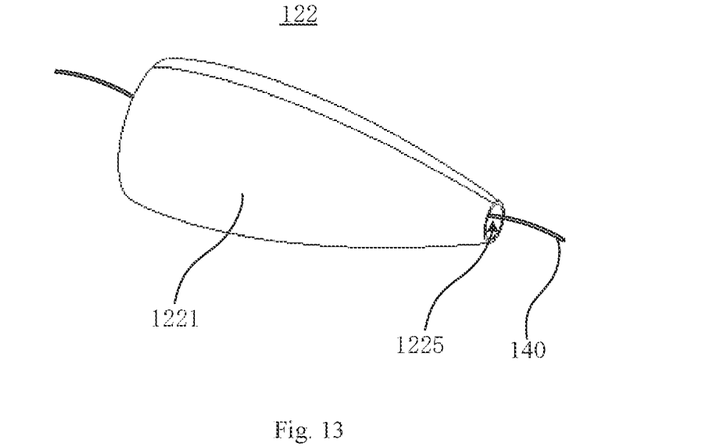
FIG. 13 is a schematic diagram of a second connector according to another embodiment of the present disclosure.
Figure 14:
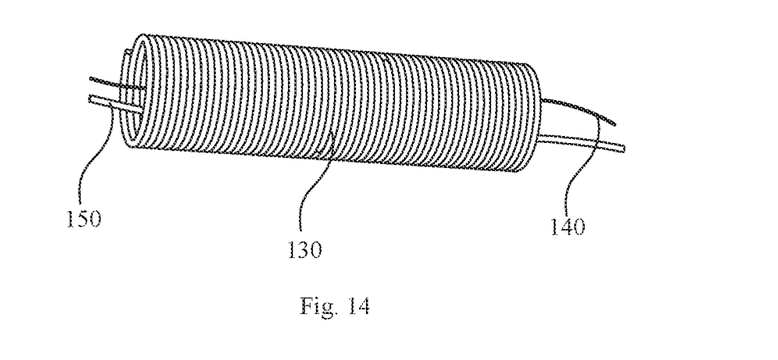
FIG. 14 is a schematic diagram of an elastic member according to one embodiment of the present disclosure.

Referring to FIG. 13. FIG. 13 is a schematic diagram of a second connector 122 according to another embodiment of the present disclosure. As shown in FIG. 14, the second connector 122 may not be provided with a plug 1223. Instead, the second connector 122 may define an internal through-hole 1225 through which the transmission line 140 is electrically connected to an external apparatus such as a cable 30. The transmission line 140 may be secured in the internal through-hole 1225 by means of adhesive such as resin, and the through-hole 1225 may be sealed by adhesive such as resin.

Referring to FIG. 14 in conjunction with FIG. 4 and FIG. 5. FIG. 14 is a schematic diagram of one embodiment of the elastic member 130. The elastic member 130 may be bent and deformed, thereby enabling the probe 60 to change its detection angle. The elastic member 130 is shown in FIG. 14 as an elastic member, in particular a spring. The elastic member may be made of elastic materials such as elastic metal, elastic ceramic, elastic composite material, rubber, etc., which is not limited in the present disclosure. An end of the elastic member 130 may be fixedly connected to the side of the first connector 121 away from the probe 60, and the other end may be fixedly connected to the side of the second connector 122 closer to the probe 60.

Figure 15:
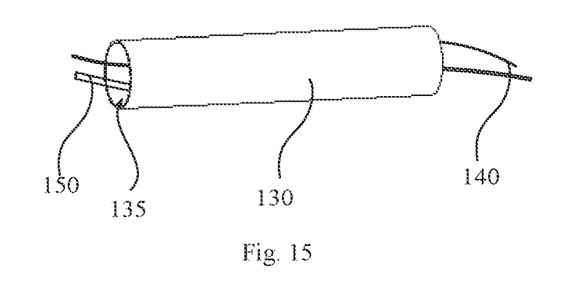
FIG. 15 is a schematic diagram of another elastic member according to another embodiment of the present disclosure.

Referring to FIG. 15. FIG. 15 is a schematic diagram of another embodiment of the elastic member 130. As shown in FIG. 15, the elastic member 130 is a columnar elastic member and may have the shape of a hollow tube. The elastic member 130 may be made of elastic materials such as elastic metal, elastic ceramic, elastic composite material, rubber, etc., which is not limited in the present disclosure.

The elastic member 130 as shown in FIG. 14 or FIG. 15 may be sleeved on both the transmission line 140 and the flexible protector 150 to protect the transmission line 140 and the flexible protector 150. For example, as shown in FIG. 15, the elastic member 130 may define an internal passage 135 in which the transmission line 140 and the flexible protector 150 may be threaded.

Figure 16:
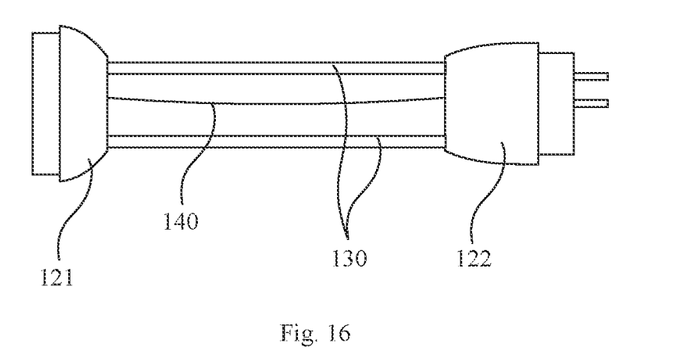
FIG. 16 is a schematic diagram of an elastic member according to yet another embodiment of the present disclosure.

In some embodiments, referring to FIG. 16, the transmission line 140 may also be arranged side-by-side with the elastic member 130 and need not to be located within the elastic member 130. In FIG. 16, a plurality of elastic members 130 are illustrated to be provided symmetrically between the first connector 121 and the second connector 122. The transmission line 140 may be provided between the first connector 121 and the second connector 122 and may be arranged side by side with the elastic member 130.

Referring again to FIG. 5. As shown in FIG. 5, an end of the transmission line 140 may be threaded through the first connector 121 and connected to the probe 60, the other end of the transmission line 140 may be connected to the second connector 122 to transmit the detection data acquired by the probe 60 to the cable 30.

In some embodiments, an end of the transmission line 140 may be secured in the first connector 121 while being threaded through the first connector 121. For example, the transmission line 140 may be secured at the first connector 121 by adhesive, resin, etc., and may continue to pass through the first connector 121 and connect with the circuit module 640.

In some embodiments, the other end of the transmission line 140 may be fixedly connected to the second connector 122, and electrically connected to the plug 1223 of the second connector 122 (referring to FIG. 12), to be electrically connected to the external apparatus through the plug 1223. In some embodiments, as shown in FIG. 13, the other end of the transmission line 140 may be threaded through the second connector 122, secured in the second connector 122, and continue to pass through the second connector 122 to connect with the external apparatus. For example, the transmission line 140 may be secured at the second connector 122 by adhesive, resin etc.

The transmission line 140 may be configured to transmit data. In some embodiments, the transmission line 140 may also be configured to transmit electrical power. The transmission line 140 may be a kind of wire common in the art and may be a single or multi-stranded wire, which is not limited in the present disclosure.

Referring to FIG. 5. An end of the flexible protector may be connected to the first connector 121, the other end of the flexible protector 150 may be connected to the second connector 122. The flexible protector 150 may be a flexible member whose length is substantially constant and may not able to be shortened or stretched. The length of the flexible protector 150 may be greater than the length of the elastic member 130 in its natural state, and less than the length of the transmission line 140 between the first connector 121 and the second connector 122. With this configuration of the flexible protector 150, the flexible protector 150 may allow the deformation of the flexible connection or the elastic member 130. And when the elastic member 130 or the elastic member is deformed, the flexible protector 150 may maintain or keep the connection between the first connector 121 and the second connector 122, thereby protecting the connection between the transmission line 140 and the first connector 121 an/or the connection between the transmission line 140 and the second connector 122, as well as protecting the transmission line 140 from being pulled to break or torn.

In some embodiments, as shown in FIG. 5, the flexible protector 150 and the transmission line 140 may be arranged in parallel. The flexible protector 150 may have a shape of a wire. The flexible protector 150 may be a rope consisting of a plurality of fibers. Said fibers may for example be nylon fibers, vegetable fibers, glass fibers, etc. In some embodiments, the flexible protector 150 may be a metal stranded wire formed by a plurality of metal wires twisted together. The flexible protector 150 may also be composed of other materials, as long as it can be flexibly bent but generally not elastically stretched.

Figure 17:
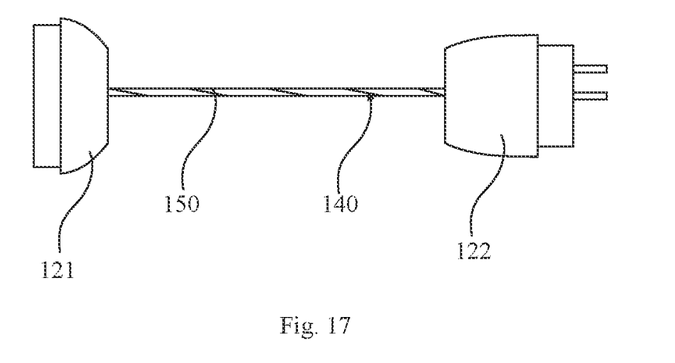
FIG. 17 is a schematic diagram of an arrangement of a flexible protector and a transmission line according to one embodiment of the present disclosure.

In some embodiments, as shown in FIG. 17, the flexible protector 150 may have a shape of a wire, and the transmission line 140 may be coiled and wrapped around the flexible protector 150. For clarity, the elastic member 130 may be omitted in FIG. 17. By coiling and wrapping the transmission line 140 around the flexible protector 150, the flexible protector 150 may further provide structural support for the transmission line 140, reducing its bending, shaking, etc., and increasing the service life of the transmission line 140.

Figure 18:
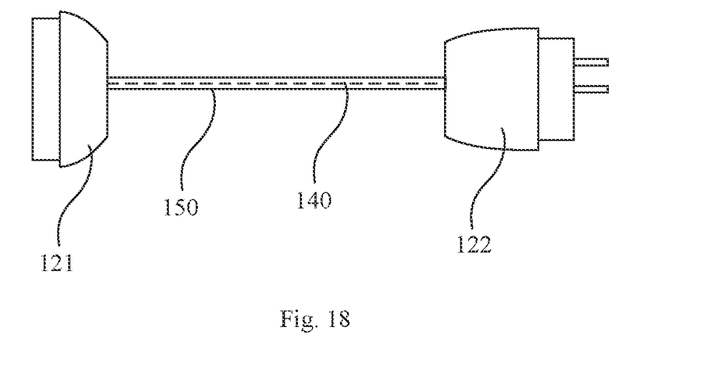
FIG. 18 is a schematic diagram of an arrangement of the flexible protector and the transmission line according to another embodiment of the present disclosure.

In some embodiments, as shown in FIG. 18, the flexible protector 150 may have a shape of a hollow tube and sleeved on the transmission line 140. For clarity, the elastic member 130 may be omitted in FIG. 18. By sleeving the flexible protector 150 on the transmission line 140, the flexible protector 150 can provide structural support for the transmission line 140, reducing its bending, shaking, etc. Further, the flexible protector 150 may protect the surface structure of the transmission line 140, reducing the impact of environmental dust, temperature changes, etc. on the transmission line 140 and thereby increasing the service life of the transmission line 140. In some embodiments, the flexible protector 150 may be a sheath woven from metal wire, nylon fiber, etc. In some embodiments, the flexible protector 150 may be a flexible plastic hollow tube.

In summary, the detector 10 of the present disclosure may include an elastic member 130 and a flexible protector 150 both arranged between and connected to the first connector 121 and the second connector 122. An end of the flexible protector 150 may be connected to the first connector 121, the other end of the flexible protector 150 may be connected to the second connector 122. The length of the flexible protector 150 may be set to be greater than the length of the elastic member 130 in its natural state, and less than the length of the transmission line 140 between the first connector 121 and the second connector 122. With this arrangement, when the elastic member 130 is bent or stretched, the flexible protection member 150 may limit the length of the elastic member 130 after deformation to be less than the length of the flexible protector 150. Since the length of the flexible protector 150 is less than the length of the transmission line 140 between the first connector 121 and the second connector 122, the flexible protector 150 may limit the length of the elastic member 130 after deformation to be less than the length of the transmission line 140 between the first connector 121 and the second connector 122, thus ensuring that the transmission line 140 cannot be stretched and serving to protect the transmission line 140.

It should be noted that the above-mentioned detector 10 can be used not only for pipeline detection, but also for detecting other areas where people are not convenient or do not want to reach or detect directly. These areas may, for example, be the natural lumen of humans or animals, such as the esophagus, trachea, stomach, etc. These areas may also be areas with poor sanitary conditions or survival indicators, such as urban underground pipelines, tunnels and other areas. Embodiments of the present disclosure do not impose any limitation on this.

The above are only implementations of the present disclosure, and do not limit the patent scope of the present disclosure. Any equivalent changes to the structure or processes made by the description and drawings of this application or directly or indirectly used in other related technical field are included in the protection scope of this application.

What is claimed is:

1. A detector, comprising:
   a probe;
   a first connector, connected to the probe;
   a second connector, configured to connect to an external apparatus;
   an elastic member, arranged between and connected to the first connector and the second connector, and defining an internal passage;
   a transmission line for data transmission, an end of which passes through the first connector and is connected to the probe, the other end of which is fixedly and electrically connected to the second connector; wherein the transmission line is arranged in the internal passage; and
   a flexible protector, an end of which is connected to the first connector, the other end of which is connected to the second connector; wherein the flexible protector is arranged in the internal passage;
   wherein a length of the flexible protector is greater than a length of the elastic member in its natural state, and less than a length of the transmission line between the first connector and the second connector,
   in response to being in the natural state, the elastic member is not subject to any applied forces,
   wherein the flexible protector has a shape of a wire or a hollow tube, or the flexible protector is a rope consisting of a plurality of fibers.

2. The detector as claimed in claim 1, wherein
   in response to the flexible protector having a shape of a wire, the transmission line is coiled and wound on the flexible protector.

3. The detector as claimed in claim 1, wherein
   in response to the flexible protector having a shape of a hollow tube, the flexible protector defines an internal channel, the transmission line is in the internal channel.

4. The detector as claimed in claim 1, wherein
   the flexible protector is provided in parallel with the transmission line.

5. The detector as claimed in claim 1, wherein
   the elastic member is a spring.

6. The detector as claimed in claim 1, wherein the probe comprises:
   a housing, comprising a first end and a second end opposite to each other, wherein the first end is connected to the first connector;
   a seat, arranged in the housing;
   a camera, arranged in the housing, and connected to one side of the seat, wherein the camera faces the first end; and
   a circuit module, arranged in the housing, and connected to the other side of the seat away from the camera;
   wherein the transmission line passes through the first connector and connects with the circuit module for data transmission.

7. The detector as claimed in claim 6, wherein
   the probe further comprises a signal transmitter arranged within the housing, the signal transmitter is configured to detect a location of the probe; and
   the signal transmitter is connected to the circuit module.

8. The detector as claimed in claim 7, wherein the signal transmitter comprises:
   a bracket, comprising a columnar main body; and
   a coil, wound on the main body, wherein two ends of the coil are connected to the circuit module.

9. The detector as claimed in claim 8, wherein
   the main body is hollow, the circuit module comprises a first circuit module, a second circuit module and a third circuit module, the main body surrounds the second circuit module.

10. The detector as claimed in claim 9, wherein the bracket further comprises:
    a first flange, connected to an end of the main body, and projecting outward along a radial direction of the main body; and
    a second flange, connected to the other end of the main body, and projecting outward along a radial direction of the main body;
    wherein the first flange and the second flange are arranged in the housing by means of an interference fit,
    wherein a first side wall of the first flange and a second side wall of the second flange are stuck inside the housing by means of the interference fit.

11. The detector as claimed in claim 8, wherein
a side wall is arranged at the outer periphery of the first flange and extends parallel to an axial direction of the main body, to define an accommodation cavity, at least a portion of the circuit module is accommodated in the accommodation cavity.

12. The detector as claimed in claim 6, wherein the probe further comprises:
a transparent cover, arranged on the first end of the housing and configured to seal the probe, wherein the camera faces the transparent cover and receives light incident via the transparent cover; and
a light source, provided around the outer periphery of the camera, and providing light for the camera.

13. The detector as claimed in claim 6, wherein the circuit module comprises:
a first circuit module, fixed to one side of the seat away from the camera, wherein the first circuit module has a shape of a circular disc;
a second circuit module, an end of which connected to the first circuit module, wherein the second circuit module has a square shape and is arranged perpendicular to the first circuit module; and
a third circuit module, connected to the other end of the second circuit module, wherein the third circuit module has a shape of a circular disc and is arranged in parallel with the first circuit module.

14. The detector as claimed in claim 13, wherein
a groove is defined in the third circuit module, and the second circuit module is plugged in the groove.

15. A detector, comprising:
a probe;
a first connector, connected to the probe;
a second connector, configured to connect to an external apparatus;
an elastic member, arranged between and connected to the first connector and the second connector, and defining an internal passage;
a transmission line for data transmission, an end of which passes through the first connector and is connected to the probe, the other end of which is fixedly and electrically connected to the second connector; wherein the transmission line is arranged in the internal passage; and
a flexible protector, an end of which is connected to the first connector, the other end of which is connected to the second connector; wherein the flexible protector is arranged in the internal passage;
wherein in response to the elastic member being elastically deformed, the flexible protector is configured to keep connecting with the first connector and the second connector, and protect the connection of the transmission line with the first connector and the second connector,
wherein the flexible protector has a shape of a wire or a hollow tube, or the flexible protector is a rope consisting of a plurality of fibers.

16. A detecting system, comprising:
a detector configured to acquire detection data and comprising:
a probe;
a first connector, connected to the probe;
a second connector, configured to connect to an external apparatus;
an elastic member, arranged between and connected to the first connector and the second connector, and defining an internal passage;
a transmission line for data transmission, an end of which passes through the first connector and is connected to the probe, the other end of which is fixedly and electrically connected to the second connector; wherein the transmission line is arranged in the internal passage; and
a flexible protector, an end of which is connected to the first connector, the other end of which is connected to the second connector; wherein the flexible protector is arranged in the internal passage;
wherein a length of the flexible protector is greater than a length of the elastic member in its natural state, and less than a length of the transmission line between the first connector and the second connector;
a display, configured to display the detection data acquired by the detector; and
a cable, connected between the second connector and the display, and connected to the transmission line through the second connector, wherein the cable is configured to connect the detector to the display, and transmit the detection data to the display,
in response to being in the natural state the elastic member is not subject to any applied forces,
wherein the flexible protector has a shape of a wire or a hollow tube, or the flexible protector is a rope consisting of a plurality of fibers.

17. The detecting system as claimed in claim 16, wherein
the probe comprises a housing and a signal transmitter arranged within the housing, the signal transmitter is configured to detect a location of the probe;
the detecting system further comprises a signal receiver, configured to receive a signal transmitted by the signal transmitter of the detector, and determine a location of the detector.

18. The detecting system as claimed in claim 16, further comprising:
a wire-winding frame, on which the cable being wound.

19. The detecting system as claimed in claim 18, wherein
the wire-winding frame comprises a main support frame and a rotating bracket, the rotating bracket is rotatably mounted on the main support frame, the cable is wound on the rotating bracket, the cable is configured to be rewound or released by rotation of the rotating bracket.

\* \* \* \* \*